Figure 1:
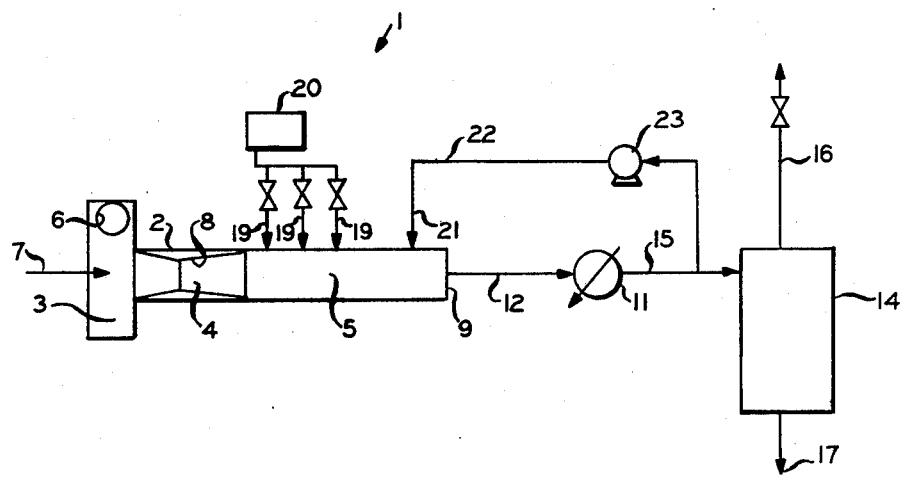

United States Patent [19]

Mills et al.

[11] 4,265,870

[45] May 5, 1981

[54] METHOD FOR PRODUCING CARBON BLACK

[75] Inventors: King L. Mills; Paul H. Johnson, both of Bartlesville, Okla.

[73] Assignee: Phillips Petroleum Company, Bartlesville, Okla.

[21] Appl. No.: 746,963

[22] Filed: Dec. 2, 1976

[51] Int. Cl.³ .......................... C01B 31/02; C09C 1/48
[52] U.S. Cl. ..................................... 423/450; 423/449
[58] Field of Search ........................ 423/449, 450, 456; 23/259.5

[56] References Cited

U.S. PATENT DOCUMENTS

| | | | |
|---|---|---|---|
| 3,369,870 | 2/1968 | Ganz et al. | 423/450 |
| 3,615,211 | 10/1971 | Lewis | 423/450 |
| 3,734,999 | 5/1973 | Dollinger | 423/450 |

FOREIGN PATENT DOCUMENTS 607296  8/1948  United Kingdom ..................... 423/450

Primary Examiner—Herbert T. Carter
Assistant Examiner—Gregory A. Heller

[57] ABSTRACT

A method and apparatus are provided for producing carbon black wherein in a carbon black reactor a first quench of effluent flowing through a quench zone is effected by contact of the effluent with water. The first quench cools the effluent to a temperature sufficiently low to stop pyrolysis. Downstream of the first quench is a secondary quench in which cooled smoke ahead of the filters is contacted with the effluent for secondary cooling the effluent. After the second cooling the effluent flows to an indirect heat exchanger wherein the effluent is again cooled, by indirect contact with a coolant in the heat exchanger, to a temperature sufficiently low to prevent damage to the filter system.

6 Claims, 1 Drawing Figure

METHOD FOR PRODUCING CARBON BLACK

In the production of carbon black it is necessary to stop the pyrolysis at a certain point so as to produce a certain type of carbon black. This requires cooling of the effluent flowing from the reaction zone to a temperature sufficiently low to stop the pyrolysis after a certain amount or degree of pyrolysis has been achieved. The degree of pyrolysis determines the type of carbon black produced. In the past it has been common to inject a coolant into the reactor for direct contact with the effluent to cool same to the pyrolysis stopping temperature. This typically was accomplished by the injection of water into the quench zone which has been effective to cool the effluent. Also, cooling has been accomplished by injecting cooled smoke, which is recycled from the effluent stream upstream of the filter system, into the quench zone to effect cooling of the effluent. Both types have advantages and disadvantages relative to one another wherein for example cooling with water requires a small amount of water compared to the amount of smoke necessary to effect the quenching but then the injection of water has the disadvantage of producing a large amount of water vapor which must be handled by the filter system which relative to a smoke quench requires a larger filter system which is one of the major expenses in a carbon black producing apparatus. Also, with more water there is a higher probability of water vapor condensation with resulting corrosion of the filter system. The use of smoke has the advantage of not producing a large amount of gas thereby permitting a smaller filter system but then it has the disadvantage of requiring large amounts of smoke to effect the cooling. Smoke or gas quenching poses several practical problems in the introduction of such a large amount of smoke or gas into the reactor which physically requires a large inlet compared to a water inlet and also requires a blower or compressor to pressurize the smoke so that same can be introduced into the reactor. It is also known in the art that a dual quench can be used wherein smoke is first introduced into the reactor to effect prequenching of the reaction which is then followed by a downstream water or trim quench to effect final cooling of the effluent. Such a process is disclosed in U.S. Pat. No. 3,369,870, issued Feb. 21, 1968 to S. F. Ganz et al. However, in this patent the water introduction into the effluent stream is accomplished downstream of an indirect heat exchanger which is positioned downstream of the smoke introduction.

The present invention provides an alternate to the above described processes and takes advantage of the relative merits of both the introduction of water and smoke as quench fluids. From the filter system standpoint, the use of only water as the quench fluid requires the largest filter system whereas the use of only cooled smoke as the quench fluid requires the smallest filter system and the use of smoke and water together as quench fluids with the smoke being introduced upstream of the water quench requires a filter system between the two above-described processes. The present invention by introducing water first and smoke second as the quench fluids provides a method wherein a filter system can be sized between the filter system required for smoke first and water second and the size of a filter system required for a total smoke quench, while still effecting adequate quenching of the effluent. Also, by using water as the pre-quench fluid wherein smaller inlets can be used compared to smoke inlets, and since normally a plurality of pre-quench inlets are provided same can be closer together.

The principal objects and advantages of the present invention are: to provide a method and apparatus for producing carbon black which is effective for quenching the reaction and stopping the pyrolysis at a predetermined point; to provide such a method and apparatus which requires a minimum of change in existing equipment to accomplish the desired end result; to provide such a method which will result in effective quenching while minimizing the amount of gas which is required to be handled by a filter system thereby resulting in the need for a smaller filter system and reduced capital outlay for a carbon black producing apparatus; and to provide such a method and apparatus which is well adapted for its intended use.

Other objects and advantages of the present invention will become apparent from the following detailed description taken in connection with the accompanying drawings wherein are set forth by way of illustration and example certain embodiments of this invention.

FIG. 1 is a schematic illustration of a carbon black producing apparatus.

Referring more in detail to the drawing:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate structure.

The reference numeral 1 designates generally a carbon black producing apparatus which includes a reactor 2 which can be of any suitable construction such as those already known in the art and the illustrated reactor 2 is similar to that disclosed in U.S. Pat. No. 2,564,700. The reactor 2 includes a precombustion zone 3 which has communicating therewith and downstream thereof a reaction zone 4 which has downstream thereof a quench zone 5. Means 6 communicate with the precombustion zone 3 for the introduction of combustion gases such as air and a combustible fuel or a burning mixture of same, or hot gases of combustion, and as shown the means 6 includes a conduit which opens into the precombustion zone and is directed in a generally tangential manner to effect swirl or vortex flow of fluid therein. A make hydrocarbon introduction means also opens into either the precombustion zone 3 or reaction zone 4 and is operable for injecting a make-hydrocarbon (sometimes called "oil" or "make oil") thereinto. This generally is a conduit 7 which has a spray nozzle on the end thereof as is known in the art. A venturi 8 can also be provided in the reaction zone 4 as is known in the art. Although a vortex type reactor is disclosed above, it is to be understood that any suitable type of carbon black producing apparatus can be used. The quench zone 5 has an outlet 9 at the downstream end thereof and the outlet 9 is connected to an indirect heat exchanger 11 via a conduit 12 wherein effluent flowing through the quench zone and out the outlet 9 is conducted to the heat exchanger 11. The heat exchanger 11 can be of any suitable type.

Filter means 14 of any suitable type such as a bag filter is in flow communication with the conduit 12 and the outlet 9 via a conduit 15 which connects the filter means 14 to the heat exchanger 11. In the filter means 14 effluent is separated into a gaseous phase or off-gas and a solid phase wherein the gaseous phase is taken as an overhead product out a discharge 16 and the particulate or solid portion of the effluent is taken as a bottoms product out a discharge 17 which can then be conducted to other processing equipment such as pelleters and dryers, as are known in the art.

Quench fluid inlet means communicate with the quench zone 5 and as shown an inlet 19 is connected to a source 20 of liquid coolant such as water. Downstream of the inlet 19 there is a second quench fluid inlet 21 which is connected to a source of cooling gas which preferably includes the conduit 15 upstream of filter 14 and downstream of the heat exchanger 11 via a conduit 22. A suitable blower or other flow inducing device 23 is connected in the conduit 22 so as to pressurize the fluid flowing therethrough so that same can be introduced into the quench zone 5 through the inlet 21. The inlet 21 is positioned between the outlet 9 (also the heat exchanger 11) and the inlet 19 wherein the first quench (prequench) of the reaction is accomplished by water injected through the inlet 19 and the second cooling is accomplished by the injection of cooling fluid injected through the inlet 21 and a third cooling is accomplished by indirect heat exchange in the heat exchanger 11.

The present invention is more fully understood by a description of the operation thereof. A burning mixture of combustible gas and air contacts a make-hydrocarbon injected through the conduit 7 and at a predetermined point along the length of the reactor 2 the effluent containing smoke which contains gases and carbon black in particulate form is contacted with water injected through the inlet 19. It is to be understood that the reactor 2 can be provided with a plurality of inlets 19 positioned along the length thereof with the choice of the particular inlet being dictated by the particular carbon black desired to be made wherein the degree of pyrolysis is determined by the length of time which, in turn, is determined by how far the effluent which is being pyrolyzed, flows down the length of the reactor 2 before quenching. A sufficient quantity of water is injected through the inlet 19 to lower the temperature of the effluent to a temperature sufficiently low to stop the pyrolysis of the make hydrocarbon wherein typically this temperature would be a temperature of up to about 2200° F. After the first cooling, the cooled effluent flows further along the quench zone 5 and is then contacted with cooled gas which preferably is smoke from the conduit 15 which normally contains some water vapor, from the introduction of water into the quench zone, to further cool the effluent which also contains water vapor by virtue of the water introduced through the inlet 19. The effluent is cooled secondly at the inlet 21 to a temperature of up to about 1800° F. and preferably between 1000° F. and 1800° F. After the secondary cooling, the smoke effluent which now contains gases and water vapor as well as particulate carbon black and the other various component parts of the effluent are then passed through the heat exchanger 11 for a further reduction in the temperature thereof wherein the temperature is lowered to a temperature sufficiently low to prevent damage to the filter unit but yet sufficiently high to prevent condensation of deleterious materials therein such as to prevent the formation of acids like sulfuric acid which also damages the filter system. This temperature is up to about 600° F. and is preferably between about 400° F. and 600° F. and most preferably about 450° F. The cooled effluent after passing through the heat exchanger 11 is then conducted to the filter means 14 for separation of the effluent into a gaseous phase and a solid phase with the gaseous phase being discharged through the outlet 16 and the particulate solid phase being discharged through the discharge 17. A portion of the smoke and water vapor taken upstream of filter 14 is preferably recycled to be used as the cooling smoke for injecting through the inlet 21. The remaining portion of the cooled smoke and water vapor is passed to filter 14 and the off-gas is removed at 16 as a product which can be used as a heating material or the like.

To further illustrate the present invention, the following calculated example is provided:

|  | 1<br>All Water<br>QI-2200° F.<br>QII-1300° F. | 2<br>All Smoke<br>QI to 2200° F.<br>QII to 1300° F. | 3<br>Smoke Prequench-2200° F.<br>$H_2O$ Final Q-1300° F. | 4<br>Water Preq.-2200° F.<br>Smoke to 1300° F. |
|---|---|---|---|---|
| Recycle Blower Smoke at 20 psia, SCF/H | 0 | 282,353 | 34,286 | 223,455 |
| Total to Filter, SCF/H | 255,380 | 200,000 | 249,600 | 211,041 |
| Amount Cooled from 1300 to 450° F., SCF/H | 255,380 | 482,353 | 283,886 | 434,496 |
| Water Added (Shown SCF/H Steam Made) | 55,380[1] | 0 | 49,600[2] | 11,041 |
| Vol. % $H_2O$ (as steam) Added to Smoke, of Smoke | (28) | 0 | (25) | (5.5) |

[1] Total liquid water added, 315 gph
[2] Total liquid water added, 239 g/n.

Reactor:

Precombustion Zone:

| | | |
|---|---|---|
| Diameter, inches, | 39 | (99.06 cm) |
| Length, inches | 12 | (30.48 cm) |

Reaction Zone:

| | | |
|---|---|---|
| Diameter, inches, | 15 | (38.10 cm) |
| Length to Prequench, inches | 48[1] | (121.92 cm) |

[1] Three prequench loci are installed on the reactor at 36 inches (91.44 cm), 42 inches (106.68 cm), and 48 inches (121.92 cm) downstream from the outlet of the precombustion zone. Only one prequench is used at a time, depending on the type of carbon black desired to be produced.

| | | |
|---|---|---|
| Length to final quench, inches | 120 | (304.8 cm) |

-continued

| Operation: (for N330 Carbon Black): | | |
|---|---|---|
| Tangential Air, SCF/hr., | 183,500 | (5200 m³) |
| Tangential Methane Fuel, SCF/hr., | 12,500 | (354.2 m³) |
| Axial Air, SCF/hr., | 4,000 | (113.3 m³) |
| Total Air/Fuel Vol. Ratio (150% of Stoichiometric Air) | 15:1 | |
| Make-Oil (120 BMCI, 700° F. (371° C.) Mid-Boiling Point, Aromatic Oil), U.S. gallons/hr, | 250 | (946.25 liters/hr) |
| Total Air/Oil, SCF/gal, | 750 | (5.62 m³/liter) |
| Prequench Water, at 48 inches, g/hr, | 63[2] | (238.46 liters/hr) |
| Cooled Smoke, at 120 inches, SCF/hr, | 223,455[3] | (6331.96 m³/hr) |

[2]Prequench water added at 100° F. (38° C.)
[3]Smoke added at 450° F. (232° C.), 20 psia (135 kPa)

| Carbon Black Properties (N330): | |
|---|---|
| [4]$N_2SA$, m²/gm, | 83 |
| [5]24M4 DBP, cc/100 gm, | 90 |
| [6]Photelometer, | 85 |

[4]ASTM-D-3037-71T, Method A;
[5]U.S. Pat. No. 3,548,454, as measured after crushing, by Method B, ASTM-D-2414-70;
[6]ASTM-D-1618-58T From the above data it can be seen that in column 4 that although not the least amount of total gaseous product flowing to the filter is provided by the above invention, it is the next least compared to an all smoke process with the data pertaining thereto listed in column 2. However, the use of the present invention does provide for less smoke to be injected as a coolant and also does not have the physical limitations of the size of the inlets as discussed above and also, the use of the present invention takes advantage of the quick quench provided by the injection of water while minimizing the use of water to effect the end result while maintaining a reduced amount of water vapor introduced into the filter system over an all water quench method as shown in column 1.

It is to be understood that while there has been illustrated and described certain forms of this invention, it is not to be limited to the specific form or arrangement of parts herein described and shown except to the extent that such limitations are found in the claims.

What is claimed and desired to be secured by Letters Patent is:

1. A method of producing carbon black comprising the steps of:
   (a) pyrolyzing a make hydrocarbon by heating said make hydrocarbon in a reaction zone with hot combustion gases and thereby producing smoke, containing gases and particulate carbon black;
   (b) flowing the smoke into a quench zone;
   (c) contacting the smoke in the quench zone first with water to thereby cool the smoke to a temperature sufficiently low to substantially stop the pyrolysis, thereby forming an admixture of smoke and water vapor;
   (d) contacting said admixture in the quench zone secondly with a cooling gas to thereby further cool the smoke to form a gaseous mixture containing particulate carbon black; and
   (e) separating particulate carbon black from at least a portion of said gaseous mixture.

2. A method as set forth in claim 1 wherein:
returning to said quench zone a first portion of said gaseous mixture as at least a portion of said cooling gas.

3. A method as set forth in claim 2 wherein:
the cooling of the smoke with water produces said admixture at a temperature of up to about 2200° F.

4. A method as set forth in claim 3 wherein:
the cooling of said admixture with the cooling gas produces said gaseous mixture at a temperature of up to about 1800° F.

5. A method as set forth in claim 4 including:
thirdly cooling the smoke by passing said gaseous mixture in indirect heat exchange relationship with a coolant in an indirect heat exchange means after the second cooling and before the separating of the gaseous mixture.

6. A method as set forth in claim 5 wherein:
said gaseous mixture is cooled to a temperature in the range of about 400° F. to about 600° F.

* * * * *